(12) United States Patent
Yang

(10) Patent No.: US 11,204,933 B2
(45) Date of Patent: Dec. 21, 2021

(54) DATA MANIPULATION RECORD STORAGE METHOD, SYSTEM, APPARATUS, AND DEVICE

(71) Applicant: Advanced New Technologies Co., Ltd., Grand Cayman (KY)

(72) Inventor: Xinying Yang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/803,330

(22) Filed: Feb. 27, 2020

(65) Prior Publication Data

US 2020/0372037 A1 Nov. 26, 2020

Related U.S. Application Data

(63) Continuation of application No. PCT/CN2020/071559, filed on Jan. 11, 2020.

(30) Foreign Application Priority Data

May 23, 2019 (CN) .......................... 201910435841.8

(51) Int. Cl.
*G06F 16/00* (2019.01)
*G06F 16/25* (2019.01)
(Continued)

(52) U.S. Cl.
CPC ........ *G06F 16/252* (2019.01); *G06F 16/2438* (2019.01); *G06F 16/27* (2019.01)

(58) Field of Classification Search
None
See application file for complete search history.

(56) References Cited

U.S. PATENT DOCUMENTS

2009/0029776 A1* 1/2009 Ruppert ................. H04L 12/00
463/42
2011/0191772 A1* 8/2011 Larimore .............. G06F 16/188
718/1
(Continued)

FOREIGN PATENT DOCUMENTS

CN 106874440 6/2017
CN 108694189 10/2018
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Farhan M Syed
(74) *Attorney, Agent, or Firm* — Fish & Richardson P.C.

(57) ABSTRACT

Computer-implemented methods, computer-implemented systems, and non-transitory, computer-readable media for data manipulation record storage. One computer-implemented method includes: sending, by a server, one or more manipulation instructions to a database, wherein the one or more manipulation instructions are in a structured query language (SQL) format; receiving, by the server from the database, an execution result of the one or more manipulation instructions; generating, by the server, one or more data records comprising the one or more manipulation instructions and the execution result; and determining, by the server, that a predetermined condition of generating a data block is satisfied; and generating, by the server, the data block that includes at least a portion of the data records.

18 Claims, 5 Drawing Sheets

(51) Int. Cl.
  *G06F 16/27*   (2019.01)
  *G06F 16/242*  (2019.01)

(56) References Cited

U.S. PATENT DOCUMENTS

| | | | |
|---|---|---|---|
| 2017/0083907 A1* | 3/2017 | McDonough | G06Q 20/3829 |
| 2017/0085545 A1* | 3/2017 | Lohe | G06Q 20/065 |
| 2018/0004798 A1* | 1/2018 | Kimura | G06F 12/0238 |
| 2018/0225194 A1* | 8/2018 | Saleh-Esa | G06F 11/3664 |
| 2018/0227116 A1 | 8/2018 | Chapman et al. | |
| 2019/0004789 A1* | 1/2019 | Mills | G06F 8/36 |
| 2019/0018888 A1* | 1/2019 | Madisetti | H04L 9/3297 |
| 2019/0034646 A1* | 1/2019 | Fujiwara | G06F 16/24 |
| 2019/0108898 A1* | 4/2019 | Gulati | G16H 10/60 |
| 2019/0116142 A1* | 4/2019 | Chalakudi | H04L 67/1097 |
| 2019/0158594 A1* | 5/2019 | Shadmon | H04L 9/0819 |
| 2019/0195852 A1* | 6/2019 | Bryant, Jr | G01N 33/0098 |
| 2019/0280879 A1* | 9/2019 | Lin | G06F 16/1805 |
| 2019/0286531 A1* | 9/2019 | Lin | G06F 16/2246 |
| 2019/0303887 A1* | 10/2019 | Wright | G06Q 20/0658 |
| 2019/0324958 A1* | 10/2019 | Ow | H04L 9/0637 |
| 2020/0073980 A1* | 3/2020 | Lundberg | G06F 16/2255 |
| 2020/0127844 A1* | 4/2020 | van der Laak | H04L 9/3239 |
| 2020/0186355 A1* | 6/2020 | Davies | H04L 9/3239 |
| 2020/0372037 A1* | 11/2020 | Yang | G06F 16/258 |

FOREIGN PATENT DOCUMENTS

| | | |
|---|---|---|
| CN | 108717861 | 10/2018 |
| CN | 108898449 | 11/2018 |
| CN | 109241357 | 1/2019 |
| CN | 109241753 | 1/2019 |
| CN | 109299336 | 2/2019 |
| CN | 109492053 | 3/2019 |
| CN | 109542926 | 3/2019 |
| CN | 110275916 | 9/2019 |

OTHER PUBLICATIONS

Nakamoto, "Bitcoin: A Peer-to-Peer Electronic Cash System," www.bitcoin.org, 2005, 9 pages.
International Search Report and Written Opinion in PCT Appln. No. PCT/CN2020/071559, dated Apr. 13, 2020, 10 pages (with full machine translation).

* cited by examiner

DATA MANIPULATION RECORD STORAGE METHOD, SYSTEM, APPARATUS, AND DEVICE

CROSS-REFERENCE TO RELATED APPLICATIONS

This application is a continuation of PCT Application No. PCT/CN2020/071559, filed on Jan. 11, 2020, which claims priority to Chinese Patent Application No. 201910435841.8, filed on May 23, 2019, and each application is hereby incorporated by reference in its entirety.

TECHNICAL FIELD

Implementations of the present specification relate to the field of information technologies, and in particular, to a data manipulation record storage method, system, apparatus, and device.

BACKGROUND

In database services, database connection interfaces have been widely used. Java database connectivity (JDBC) and open database connectivity (ODBC) are common. Through the database connection interfaces, a uniform structured query language (SQL) can be used to perform data manipulations on different types of databases (including a heterogeneous database).

In such a case, corresponding manipulation records and results are generated when a user accesses different types of databases through the database connection interfaces. These manipulation records and results need to be stored for search and cannot be tampered with. On this basis, a data manipulation record storage solution implementing tamper-resistance is needed.

SUMMARY

An objective of the implementations of the present application is to provide a storage solution implementing tamper-resistance to data manipulation data of a database connection interface.

To alleviate the previous technical problem, the implementations of the present application are implemented as follows:

A data manipulation record storage method is applied to a system including a database connection interface and a storage server, where the method includes the following: receiving, by the database connection interface, a manipulation instruction for a target database; sending, by the database connection interface, the manipulation instruction to the target database, and receiving a returned result of the target database for the manipulation instruction; generating, by the database connection interface, a data record including the manipulation instruction and the returned result, and sending the data record to the storage server, where the manipulation instruction is in a structured query language (SQL) format; receiving, by the storage server, the data record, and determining a hash value of each data record; and when a predetermined block generation condition is satisfied, determining, by the storage server, each data record to be written into data blocks, and generating the Nth data block including a hash value of a data block and a data record, specifically including the following: when N=1, a hash value and a block height of an initial data block are provided based on a predetermined method; or when N>1, a hash value of the Nth data block is determined based on each data record to be written into data blocks and a hash value of the (N−1)th data block, and the Nth data block including the hash value of the Nth data block and each data record is generated, where block height of data blocks increases monotonically based on a sequence of block generation times.

Correspondingly, some implementations of the present specification further provide a data manipulation record storage system, including a database connection interface and a storage server, where in the system, the database connection interface receives a manipulation instruction for a target database, sends the manipulation instruction to the target database, receives a returned result of the target database for the manipulation instruction, generates a data record including the manipulation instruction and the returned result, and sends the data record to the storage server, where the manipulation instruction is in an SQL format; and the storage server receives the data record, and determines a hash value of each data record; and when a predetermined block generation condition is satisfied, determines each data record to be written into data blocks, and generates the Nth data block including a hash value of a data block and a data record, specifically including the following: when N=1, a hash value and a block height of an initial data block are provided based on a predetermined method; or when N>1, a hash value of the Nth data block is determined based on each data record to be written into data blocks and a hash value of the (N−1)th data block, and the Nth data block including the hash value of the Nth data block and each data record is generated, where block height of data blocks increases monotonically based on a sequence of block generation times.

Correspondingly, some implementations of the present specification further provide a data manipulation record storage method, applied to a database connection interface, where the method includes the following: receiving a manipulation instruction for a target database; sending the manipulation instruction to the target database, and receiving a returned result of the target database for the manipulation instruction; generating a data record including the manipulation instruction and the returned result; and sending the data record to a storage server, so that the storage server stores the data record by using a blockchain type ledger that stores data based on a blockchain data structure (e.g., in a form of a blockchain).

Correspondingly, some implementations of the present specification further provide a data manipulation record storage apparatus, applied to a database connection interface, where the apparatus includes the following: a receiving module, configured to receive a manipulation instruction for a target database; a sending module, configured to send the manipulation instruction to the target database, where the receiving module is further configured to receive a returned result of the target database for the manipulation instruction; and a generation module, configured to generate a data record including the manipulation instruction and the returned result, where the sending module is further configured to send the data record to a storage server, so that the storage server stores the data record by using a blockchain type ledger.

According to the solutions provided in the implementations of the present specification, a manipulation instruction sent by a user and a returned result of a database corresponding to the manipulation instruction are packaged to generate a corresponding data record, and the data record is sent to a storage server for storage by using a blockchain type ledger. The user can search for a corresponding data record based on a hash value at any time, and verify whether data records on an entire data blockchain are correct. Therefore, transparent storage and integrity of database manipulation records are ensured, and user experience is enhanced.

It should be understood that the previous general description and the following detailed description are merely exemplary and illustrative, and cannot limit the implementations of the present specification.

In addition, any one of the implementations of the present specification does not need to achieve each of the previous effects.

BRIEF DESCRIPTION OF DRAWINGS

To describe the technical solutions in the implementations of the present specification or in the existing technology more clearly, the following briefly describes the accompanying drawings required for describing the implementations or the existing technology. Clearly, the accompanying drawings in the following description merely show some implementations of the present specification, and a person of ordinary skill in the art can still derive other drawings from these accompanying drawings.

DESCRIPTION OF IMPLEMENTATIONS

To make a person skilled in the art understand the technical solutions in the implementations of the present specification better, the following describes in detail the technical solutions in the implementations of the present specification with reference to the accompanying drawings in the implementations of the present specification. Clearly, the described implementations are merely some but not all of the implementations of the present specification. Other implementations obtained by a person of ordinary skill in the art based on the implementations of the present specification shall fall within the protection scope.

Currently, databases are widely used, and there are various types of databases. For example, current mainstream relational databases include Oracle, DB2, PostgreSQL, Microsoft SQL Server, Microsoft Access, MySQL, and inspur K-DB. Because databases can have different types, different interfaces exclusively used for database connection can be generated correspondingly. Common interfaces include JDBC and ODBC. The interface is an application programming interface (API) for executing an SQL instruction, and can provide uniform access for multiple different types of databases. In other words, a user can access different databases by using standard SQL instructions through the database connection interface, and it is unnecessary to develop a software program separately for each database.

Accordingly, the database connection interface can receive a returned result of a target database (i.e., a database that receives the instruction) in response to an SQL instruction. Therefore, it is essential to irrevocably store data involved in the whole process for search and verification.

Figure 1:
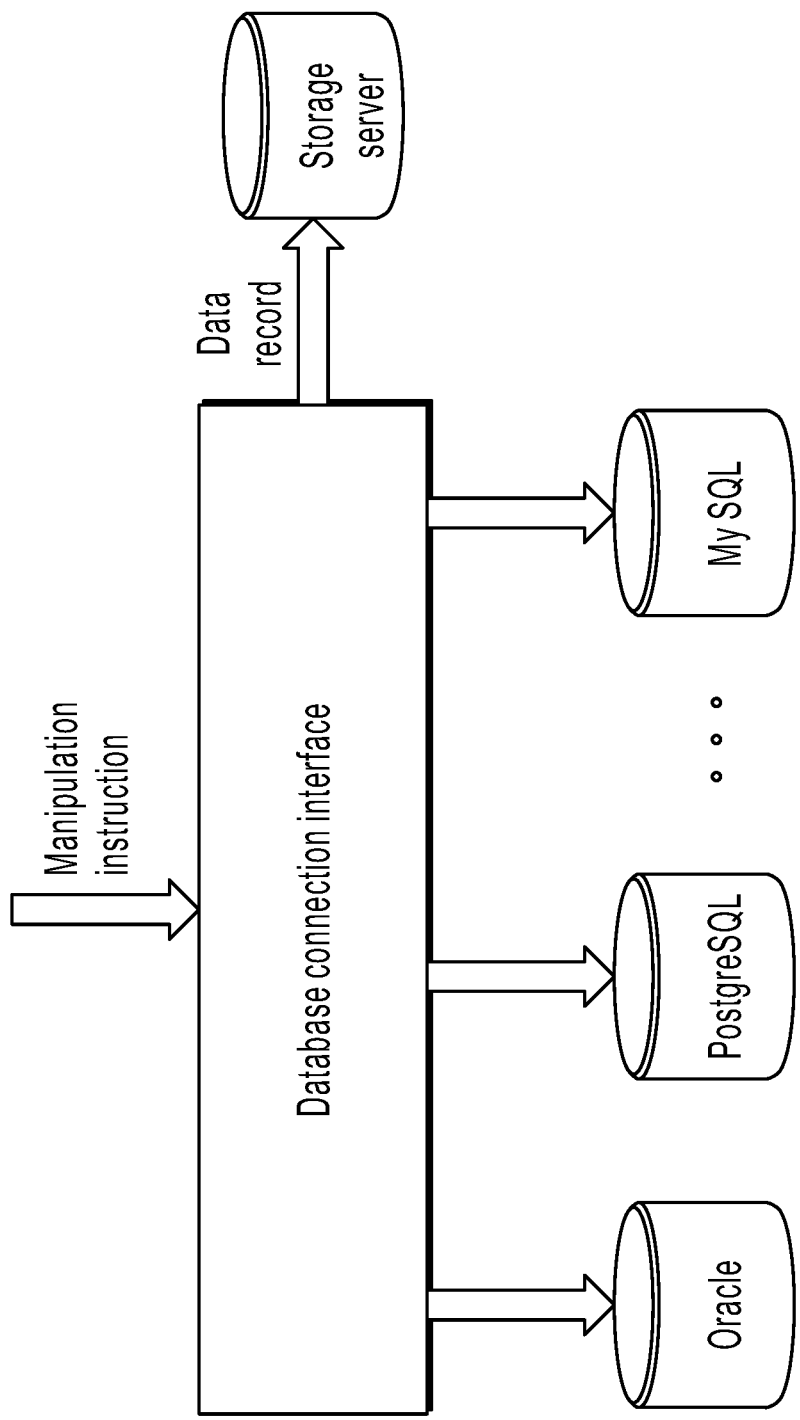
FIG. 1 is a schematic diagram illustrating a system architecture, according to some implementations of the present specification.

FIG. 1 is a schematic diagram illustrating a system architecture, according to some implementations of the present specification.

Figure 2:
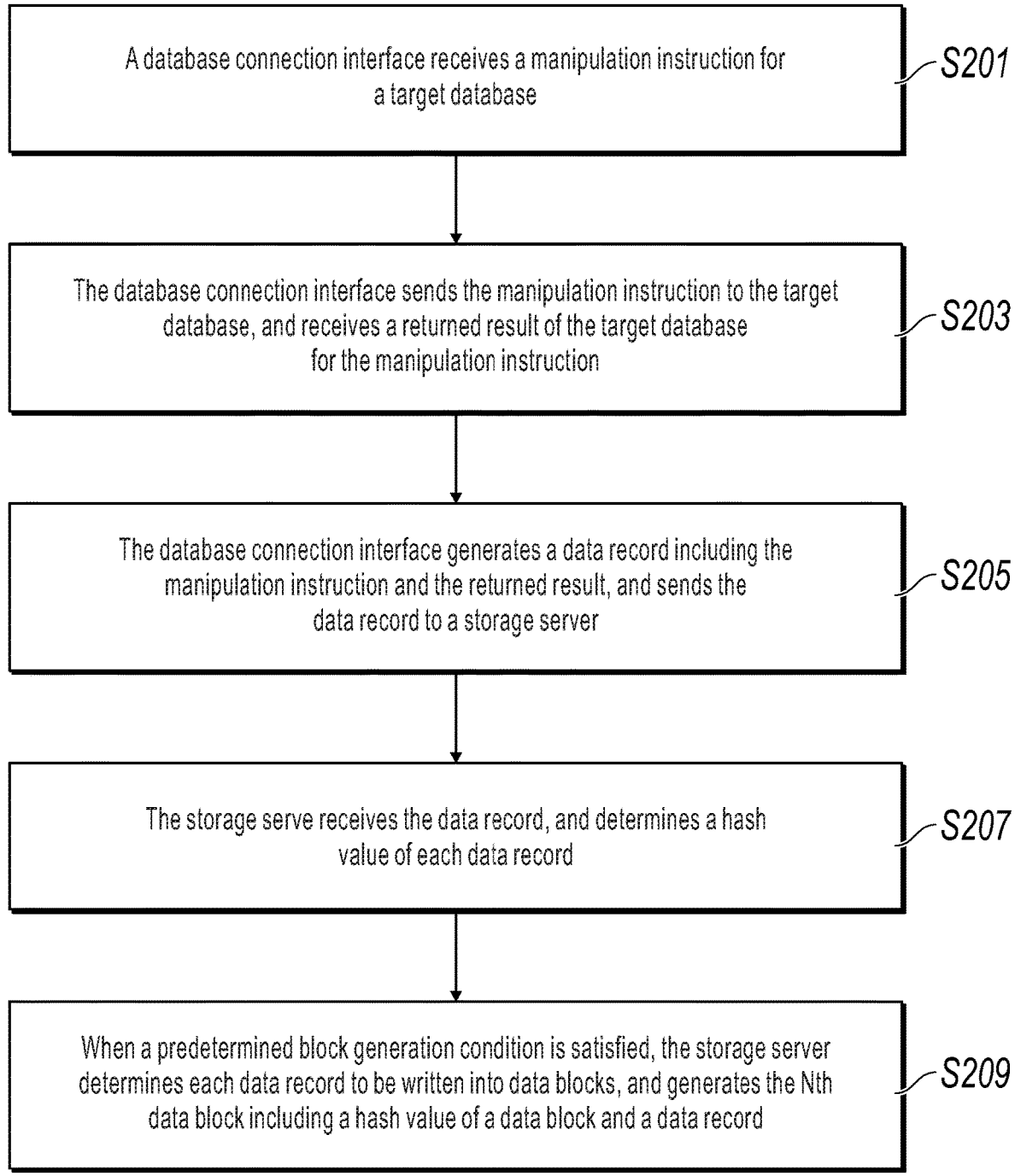
FIG. 2 is a schematic flowchart illustrating a data manipulation record storage method, according to some implementations of the present specification.

The technical solutions provided in the implementations of the present specification are described in detail below with reference to the accompanying drawings. FIG. 2 is a schematic flowchart illustrating a data manipulation record storage method, according to some implementations of the present specification. The method is applied to a system including a database connection interface and a storage server, and the process specifically includes the following steps.

S201. Receive a manipulation instruction for a target database.

In the database connection interface, for both JDBC and ODBC, an application is allowed to access data and files in different databases by using SQL, so that the application can directly manipulate data in the database.

In this process, types of manipulation instructions mainly include a data definition language (DDL), a data manipulation language (DML), and a data control language (DCL).

For example, a DDL can be a CREATE TABLE table name (column name 1 data type, column name 2 data type, . . . ), and a corresponding relationship table can be created in a target database by using the language.

For example, a DML can be INSERT INTO table_name, VALUES (value1, value2, value3, . . . ), and a new data record whose value is "(value1, value2, value3, . . . )" is inserted into "table_name" by using the language, where "table_name" and "(value1, value2, value3, . . . )" are corresponding input parameters.

For example, a DCL can be GRANT SELECT ON test.user TO 'pig'@'host', and "select" permission for "table user" in "database test" in "host" is provided to "user named pig". In this example, "host", "pig", "test", "user", and "SELECT" are input parameters in this instruction.

It is worthwhile to note that in practice, the SQL instruction has multiple other forms. For example, the DML further includes UPDATE, DELETE, etc., and the DCL further includes REVOKE, DENY, etc. The SQL instruction in the present specification is not limited to the previously described examples.

S203. Send the manipulation instruction to the target database, and receive a returned result of the target database for the manipulation instruction.

The target database correspondingly executes the SQL instruction after receiving the SQL instruction. In this process, the target database first determines an object that needs to be executed based on input parameters in the instruction, where parameters such as a table name, a field, filter criteria, and rankings that are included in the instruction can be used as input parameters. Corresponding output parameters are generated during execution. For example, a dynamic SQL instruction is shown as follows:

set @userId='0001'
set @sql='select * from Student where UserId='"@userId+
""'
exec(@sql)

The SQL instruction is used to obtain corresponding information from a table "Student" based on "UserId". In this process, input parameters include "userId='0001'" and another userId, such as "userId='0002'" or the last userId in the table, that dynamically appears in a dynamic execution process. Corresponding output parameters are records corresponding to each userId in the table.

In addition, based on the input SQL instruction, a problem may occur in the execution process of a target server, which causes an error or even a failure in the execution process. A state of an execution result can be shown by using an information prompt.

For example, "sqlcode=0" indicates that the SQL is executed successfully and no error or exception occurs in the execution process, "sqlcode>0" indicates that the SQL is executed but an exception occurs, and "sqlcode<0" indicates that an error occurs in a database system, a database connection interface system, a network, or a program, etc. Different values of sqlcode are prompt codes.

S205. Generate a data record including the manipulation instruction and the returned result, and send the data record to the storage server.

Based on the previous descriptions, the database connection interface can obtain specific content of each manipulation instruction, an input parameter included in the manipulation instruction, an output parameter generated when the target database executes the instruction, and a prompt code for a final execution result. Therefore, the database connection interface can generate a data record corresponding to the manipulation instruction, and the data record includes the manipulation instruction, the input parameter, the output parameter, and the prompt code. Then the database connection interface can send the generated data record to the storage server.

In some implementations, when generating data records, the database connection interface can further label types corresponding to the data records based on types (i.e., a DML, a DCL, or a DDL) of manipulation instructions, and send the data records and type numbers together. For example, the DML is numbered "01", the DCL is numbered "02", and the DDL is numbered "03".

S207. The storage server receives the data record, and determines a hash value of each data record.

S209. When a predetermined block generation condition is satisfied, the storage server determines each data record to be written into data blocks, and generates the Nth data block including a hash value of a data block and a data record.

The predetermined block generation condition includes the following: A quantity of data records to be stored reaches a quantity threshold; for example, each time one thousand data records are received, a new data block is generated, and the one thousand data records are written into the block; or a previous block has been generated over a predetermined time threshold; for example, a new data block is generated every five minutes, and data records received within the five minutes are written into the block.

Here, N is a sequence number of a data block. In other words, in some implementations, data blocks are arranged in the form of a blockchain based on a sequence of block generation times, and have a strong time sequence characteristic. Block height of data blocks increases monotonously based on the sequence of block generation times. The block height can be a sequence number. As such, a block height of the Nth data block is N. Or, the block height can be generated in another way. For example, a block generation time is converted into monotonously increasing large-scale data (usually 12 to 15 bits) through symmetric encryption, and the large-scale data is used as a block height of a data block.

When N=1, a data block is an initial data block. A hash value and a block height of the initial data block are provided based on a predetermined method. For example, the initial data block includes no data record, a hash value is any given hash value, and a block height blknum is 0. For another example, a triggering condition for generating the initial data block is consistent with a triggering condition for another data block, but a hash value of the initial data block is determined by hashing all content in the initial data block.

When N>1, because content and a hash value of a previous data block are determined, a hash value of the current data block (the Nth data block) can be generated based on the hash value of the previous data block (i.e., the (N−1)th data block). For example, in a feasible method, a hash value of each data record to be written into the Nth block is determined, a Merkle tree is generated based on an arrangement sequence of hash values in the block, and a root hash value of the Merkle tree is concatenated with the hash value of the previous data block. Then, the hash value of the current block is generated by using a hash algorithm, or the hash value of the current block can be generated based on the root hash value of the Merkle tree and some other metadata (e.g., a version number or a data block generation timestamp). For another example, concatenation and hashing can be performed based on a sequence of data records in a block, to obtain a hash value of an overall data record, a hash value of a previous data block is concatenated with the hash value of the overall data record, and a hash manipulation is performed on a string obtained through concatenation to generate a hash value of the data block.

Each data block includes a block header used to store metadata and a block body used to store a data record. The block header in the data block can be used to store a parent hash, a hash value of the data block, a version number, a root hash of a data record, a timestamp, etc. Certainly, a format of the block header can be defined based on service needs. The block header can further include some other information, for example, a state array used to describe a data record state. The block body is used to store a plaintext of a data record or a hash value of a data record.

A hash value of a data record and a hash value of a data block can be returned to the database connection interface for record search.

In the previously described data block generation method, each data block is determined by using a hash value, and a hash value of a data block is determined by using content of data records in the data block, a sequence of the data records, and a hash value of a previous data block. A user can initiate verification based on a hash value of a data block at any time. Modification to any content in a data block (including modification to content or a sequence of data records in the data block) causes inconsistency between a hash value of the data block calculated during verification and a hash value that exists when the data block is generated, causing a verification failure. Therefore, irrevocability is implemented in the case of centralization. In other words, the database connection interface stores all information in each manipulation in the previous way, and the storage is irrevocable, so that the database connection interface can transparently manage database manipulations.

In some implementations, when receiving a data record, the storage server can further perform classified storage based on types of manipulation instructions in the data record. In other words, only data records including the same type of manipulation instruction are written into the same data block for search later. In practice, the storage server and the database connection interface can predefine a communication protocol, so that the storage server can directly read content in the data record, to identify the type of the manipulation instruction. Alternatively or additionally, classification can be implemented based on numbers of types of manipulation instructions included in data records.

According to the solutions provided in the implementations of the present specification, a manipulation instruction sent by a user and a returned result of a database corresponding to the manipulation instruction are packaged to generate a corresponding data record, and the data record is sent to a storage server for storage by using a blockchain type ledger. The user can search for a corresponding data record based on a hash value at any time, and verify whether data records on an entire data blockchain are correct. Therefore, transparent storage and integrity of database manipulation records are ensured, and user experience is enhanced.

Correspondingly, some implementations of the present specification further provide a data manipulation record storage system, including a database connection interface and a storage server, where in the system, the database connection interface receives a manipulation instruction for a target database, sends the manipulation instruction to the target database, receives a returned result of the target database for the manipulation instruction, generates a data record including the manipulation instruction and the returned result, and sends the data record to the storage server, where the manipulation instruction is in an SQL format; and the storage server receives the data record, and determines a hash value of each data record; and when a predetermined block generation condition is satisfied, determines each data record to be written into data blocks, and generates the Nth data block including a hash value of a data block and a data record, specifically including the following: when N=1, a hash value and a block height of an initial data block are provided based on a predetermined method; or when N>1, a hash value of the Nth data block is determined based on each data record to be written into data blocks and a hash value of the (N−1)th data block, and the Nth data block including the hash value of the Nth data block and each data record is generated, where block height of data blocks monotonically increases based on a sequence of block generation times.

Further, a type of the manipulation instruction includes a DDL, a DML, or a DCL; the returned result includes an output parameter corresponding to an input parameter in the manipulation instruction and a prompt code for an execution result of the manipulation instruction; and correspondingly, the database connection interface generates a data record including the manipulation instruction, the input parameter in the manipulation instruction, the returned output parameter, and the prompt code.

Further, the storage server determines data records to be written into data blocks based on types of manipulation instructions in the data records, where the types of the manipulation instructions in the data records to be written into data blocks are the same.

Further, the database connection interface determines a type code corresponding to a type of the manipulation instruction, and generating the data record including the manipulation instruction and the returned result, where the data record includes the type code, so that the storage server identifies the type of the manipulation instruction.

Further, the predetermined block generation condition includes the following: a quantity of data records reaches a quantity threshold; or a previous block has been generated for over a predetermined time threshold.

Figure 3:
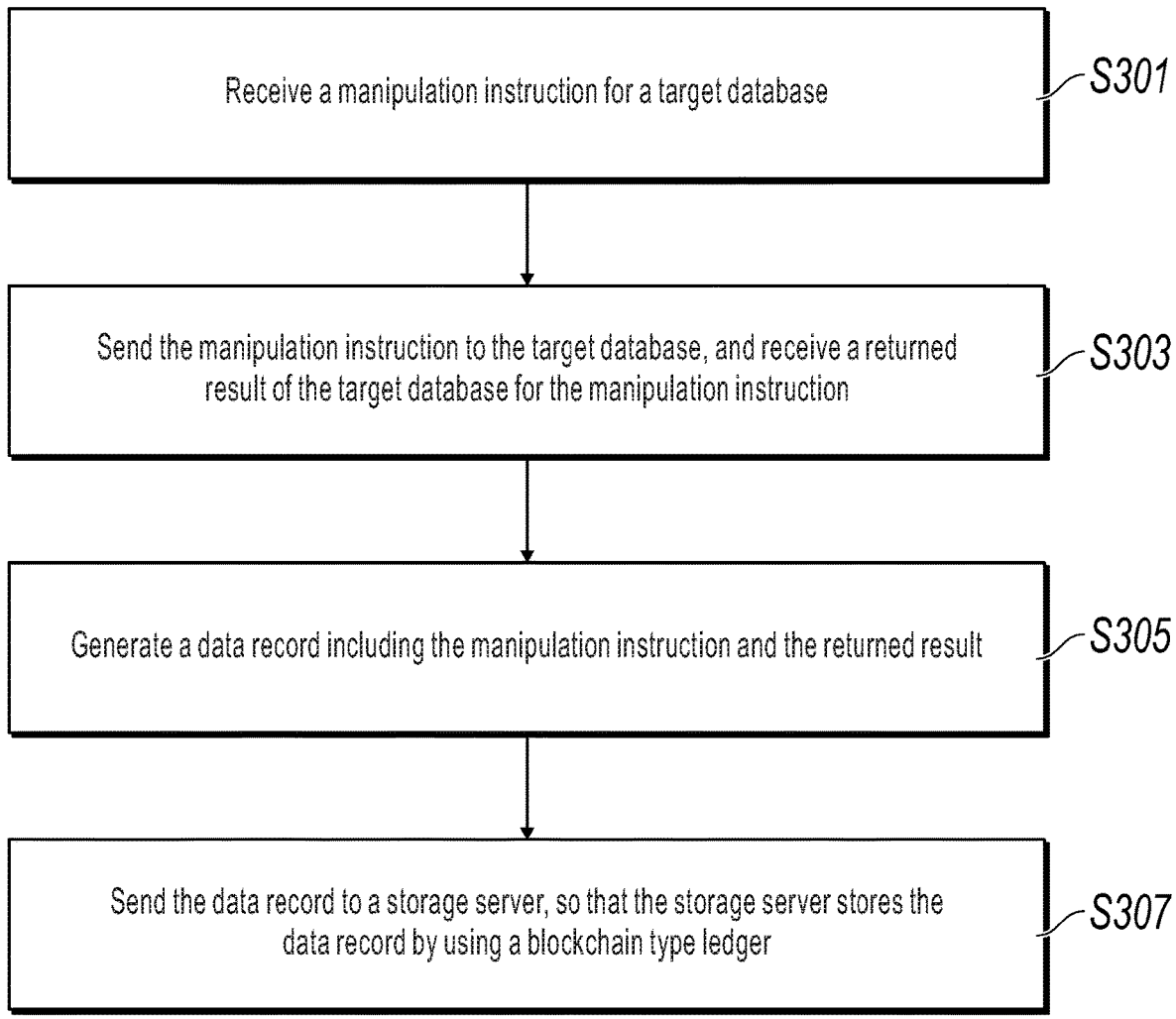
FIG. 3 is a schematic flowchart illustrating a data manipulation record storage method from the perspective of a database connection interface, according to some implementations of the present specification.

Correspondingly, some implementations of the present specification further provide a data manipulation record storage method, applied to a database connection interface. FIG. 3 is a schematic flowchart illustrating a data manipulation record storage method from the perspective of a database connection interface, according to some implementations of the present specification. The method includes the following steps:

S301. Receive a manipulation instruction for a target database.

S303. Send the manipulation instruction to the target database, and receive a returned result of the target database for the manipulation instruction.

S305. Generate a data record including the manipulation instruction and the returned result.

S307. Send the data record to a storage server, so that the storage server stores the data record by using a blockchain type ledger.

Figure 4:
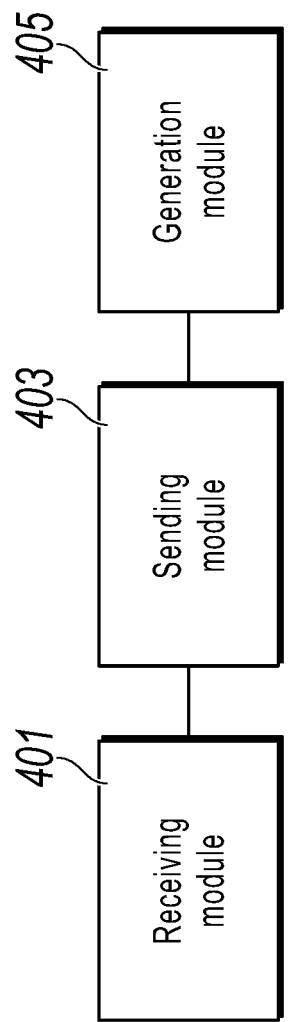
FIG. 4 is a schematic structural diagram illustrating a data manipulation record storage apparatus, according to some implementations of the present specification.

Correspondingly, some implementations of the present specification further provide a data manipulation record storage apparatus, applied to a database connection interface. FIG. 4 is a schematic structural diagram illustrating a data manipulation record storage apparatus, according to some implementations of the present specification. The apparatus includes the following: a receiving module 401, configured to receive a manipulation instruction for a target database; a sending module 403, configured to send the manipulation instruction to the target database, where the receiving module 401 is further configured to receive a returned result of the target database for the manipulation instruction; and a generation module 405, configured to generate a data record including the manipulation instruction and the returned result, where the sending module 403 is further configured to send the data record to a storage server, so that the storage server stores the data record by using a blockchain type ledger.

Some implementations of the present specification further provide a computer device. The computer device includes at least a memory, a processor, and a computer program that is stored in the memory and can run on the processor, and the processor implements the data manipulation record storage method shown in FIG. 3 when executing the program.

Figure 5:
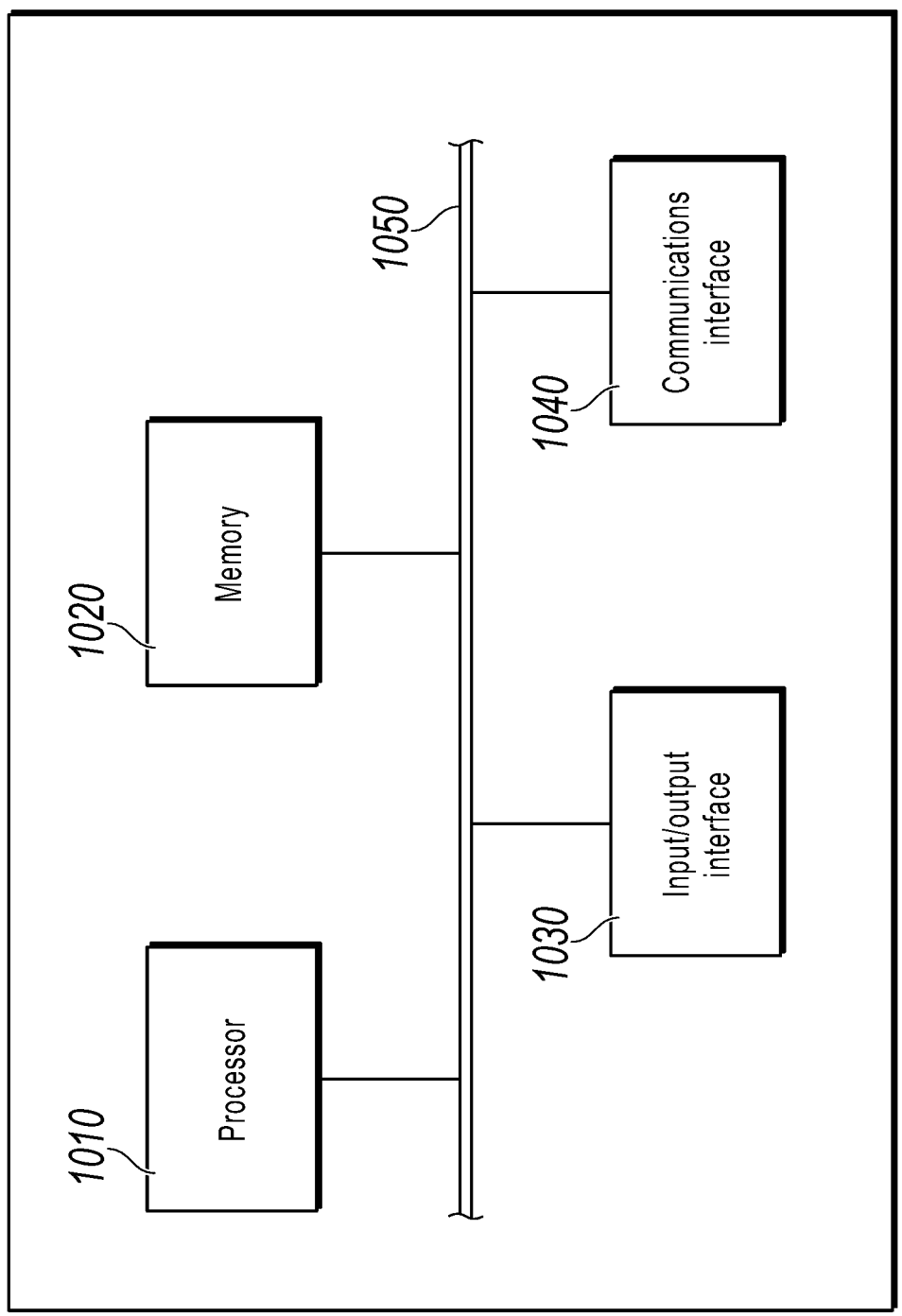
FIG. 5 is a schematic structural diagram of a device for configuring the method in the implementations of the present specification.

FIG. 5 is a more detailed schematic diagram illustrating a hardware structure of a computing device, according to some implementations of the present specification. The device can include a processor 1010, a memory 1020, an input/output interface 1030, a communications interface 1040, and a bus 1050. The processor 1010, the memory 1020, the input/output interface 1030, and the communications interface 1040 are communicatively connected to each other inside the device by using the bus 1050.

The processor 1010 can be implemented by using a general central processing unit (CPU), a microprocessor, an application-specific integrated circuit (ASIC), one or more integrated circuits, etc., and is configured to execute a related program, so as to implement the technical solutions provided in the implementations of the present specification.

The memory 1020 can be implemented by using a read-only memory (ROM), a random access memory (RAM), a static storage device, a dynamic storage device, etc. The memory 1020 can store an operating system and another application program. When the technical solutions provided in the implementations of the present specification are implemented by using software or firmware, related program code is stored in the memory 1020, and is invoked and executed by the processor 1010.

The input/output interface 1030 is configured to be connected to an input/output module, to input or output information. The input/output module (not shown in the figure) can be used as a component and configured in the device, or can be externally connected to the device, to provide a corresponding function. The input module can include a keyboard, a mouse cursor, a touchscreen, a microphone, various sensors, etc. The output module can include a monitor, a speaker, an oscillator, an indicator, etc.

The communications interface 1040 is configured to be connected to a communications module (not shown in the figure), to implement communication interaction between the device and another device. The communications module can perform wired communication (e.g., through a USB or a network cable), or can perform communication wirelessly (e.g., through a mobile network, Wi-Fi, or Bluetooth).

The bus 1050 includes a channel, used to transmit information between components (e.g., the processor 1010, the memory 1020, the input/output interface 1030, and the communications interface 1040) of the device.

It is worthwhile to note that although only the processor 1010, the memory 1020, the input/output interface 1030, the communications interface 1040, and the bus 1050 of the device are shown, in practice, the device can further include other components required for implementing normal running. In addition, a person skilled in the art can understand that the device can include only components necessary for implementing the solutions in the implementations of the present specification, but does not necessarily include each component shown in the figure.

Some implementations of the present specification further provide a computer-readable storage medium. The computer-readable storage medium stores a computer program, and the data manipulation record storage method shown in FIG. 3 is implemented when the program is executed by a processor.

The computer-readable medium includes persistent, non-persistent, movable, and unmovable media that can store information by using any method or technology. The information can be a computer readable instruction, a data structure, a program module, or other data. Examples of the computer storage medium include but are not limited to a phase change RAM (PRAM), a static RAM (SRAM), a dynamic RAM (DRAM), a RAM of another type, a ROM, an electrically erasable programmable read only memory (EEPROM), a flash memory or another memory technology, a compact disc read-only memory (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device. As described in the present specification, the computer readable medium does not include computer readable transitory media such as a modulated data signal and a carrier.

It can be seen from the previous descriptions of the implementations that, a person skilled in the art can clearly understand that the implementations of the present specification can be implemented by using software and a necessary general hardware platform. Based on such an understanding, the technical solutions in the implementations of the present specification essentially or the part contributing to the existing technology can be implemented in a form of a software product. The computer software product can be stored in a storage medium, such as a ROM/RAM, a magnetic disk, or an optical disc, and includes several instructions for instructing a computer device (which can be a personal computer, a server, a network device, etc.) to perform the method described in the implementations of the present specification or in some parts of the implementations of the present specification.

The system, method, module, or unit illustrated in the previous implementations can be specifically implemented by using a computer chip or an entity, or can be implemented by using a product having a certain function. A typical implementation device is a computer, and the computer can be specifically a personal computer, a laptop computer, a cellular phone, a camera phone, a smartphone, a personal digital assistant, a media player, a navigation device, an email receiving and sending device, a game console, a tablet computer, a wearable device, or any combination of these devices.

The implementations of the present specification are described in a progressive way. For same or similar parts of the implementations, references can be made to the implementations. Each implementation focuses on a difference from other implementations. Particularly, apparatus implementations are similar to method implementations, and therefore are described briefly. For a related part, references can be made to some descriptions in the method implementation. The previously described method implementations are merely examples. The modules described as separate parts can or cannot be physically separate. During implementation of the solutions in the implementations of the present specification, functions of the modules can be implemented in one or more pieces of software and/or hardware. Some or all of the modules can be selected based on an actual need to implement the solutions of the implementations. A person of ordinary skill in the art can understand and implement the implementations of the present specification without creative efforts.

The previous descriptions are merely specific implementations of the implementations of the present specification. It is worthwhile to note that a person of ordinary skill in the art can further make several improvements or polishing without departing from the principle of the implementations of the present specification, and the improvements or polishing shall fall within the protection scope of the implementations of the present specification.

What is claimed is:

1. A computer-implemented method for data manipulation record storage, comprising:
   sending, by a server, one or more manipulation instructions to a database, wherein the one or more manipulation instructions are in a structured query language (SQL) format;
   receiving, by the server from the database, an execution result of the one or more manipulation instructions;
   generating, by the server, one or more data records comprising the one or more manipulation instructions and the execution result;
   performing, by the server, classified storage based on one or more types of the one or more manipulation instructions in each data record, wherein performing classified storage comprises:
      determining, by the server, that a predetermined condition of generating a data block is satisfied;
      determining, by the server, a type of manipulation instructions that the data block stores;
      determining, by the server, at least a portion of the data records that includes the type of manipulation instructions and corresponding execution results;

calculating, by the server, a first hash value based on the at least a portion of the data records and a second hash value of a newest data block of a blockchain-type ledger;

generating, by the server, the data block that includes the at least a portion of the data records and the second hash value, wherein, data records comprising the same type of manipulation instruction are written into the same data block;

appending the data block to the blockchain-type ledger;

receiving, by the server, a request to verify the at least a portion of the data records from a user terminal, wherein the request includes a third hash value calculated by the user terminal;

determining, by the server based on searching the blockchain-type ledger, that the first hash value matches the third hash value; and sending, by the server to the user terminal, the at least a portion of the data records and an indication indicating that the at least a portion of the data records are correct.

2. The computer-implemented method of claim 1, wherein the data block is a starting data block of the blockchain-type ledger, the data block has a predetermined block-height.

3. The computer-implemented method of claim 1, wherein the data block is not a starting data block of a blockchain-type ledger, and a block height of the data block is greater than a block height of an immediately preceding data block of the newest data block.

4. The computer-implemented method of claim 1, wherein the predetermined condition of generating a data block is one of a volume of the data records reaches a predetermined threshold and a last data block has been generated for a predetermined time.

5. The computer-implemented method of claim 1, wherein the one or more manipulation instructions are in a subgroup of the SQL format selected from a data definition language (DDL), a data manipulation language (DML), and a data control language (DCL), the execution result further comprises output parameters corresponding to input parameters in the one or more manipulation instructions.

6. The computer-implemented method of claim 5, further comprising:
determining, by the server, a subgroup code of the subgroup of the SQL format of the one or more manipulation instructions, wherein the one or more data records further comprises the subgroup code for identifying the subgroup associated with the one or more manipulation instructions.

7. A computer-implemented system for data manipulation record storage, comprising:
one or more computers; and
one or more computer memory devices interoperably coupled with the one or more computers and having tangible, non-transitory, machine-readable media storing one or more instructions that, when executed by the one or more computers, perform operations comprising:
sending, by a server, one or more manipulation instructions to a database, wherein the one or more manipulation instructions are in a structured query language (SQL) format;
receiving, by the server from the database, an execution result of the one or more manipulation instructions;
generating, by the server, one or more data records comprising the one or more manipulation instructions and the execution result;
performing, by the server, classified storage based on one or more types of the one or more manipulation instructions in each data record, wherein performing classified storage comprises:
determining, by the server, that a predetermined condition of generating a data block is satisfied;
determining, by the server, a type of manipulation instructions that the data block stores;
determining, by the server, at least a portion of the data records that includes the type of manipulation instructions and corresponding execution results;
calculating, by the server, a first hash value based on the at least a portion of the data records and a second hash value of a newest data block of a blockchain-type ledger;
generating, by the server, the data block that includes the at least a portion of the data records and the second hash value, wherein, data records comprising the same type of manipulation instruction are written into the same data block;
appending the data block to the blockchain-type ledger;
receiving, by the server, a request to verify the at least a portion of the data records from a user terminal, wherein the request includes a third hash value calculated by the user terminal;
determining, by the server based on searching the blockchain-type ledger, that the first hash value matches the third hash value; and
sending, by the server to the user terminal, the at least a portion of the data records and an indication indicating that the at least a portion of the data records are correct.

8. The computer-implemented system of claim 7, wherein the data block is a starting data block of the blockchain-type ledger, the data block has a predetermined block-height.

9. The computer-implemented system of claim 7, wherein the data block is not a starting data block of a blockchain-type ledger, and a block height of the data block is greater than a block height of an immediately preceding data block of the newest data block.

10. The computer-implemented system of claim 7, wherein the predetermined condition of generating a data block is one of a volume of the data records reaches a predetermined threshold and a last data block has been generated for a predetermined time.

11. The computer-implemented system of claim 7, wherein the one or more manipulation instructions are in a subgroup of the SQL format selected from a data definition language (DDL), a data manipulation language (DML), and a data control language (DCL), the execution result further comprises output parameters corresponding to input parameters in the one or more manipulation instructions.

12. The computer-implemented system of claim 11, further comprising:
determining, by the server, a subgroup code of the subgroup of the SQL format of the one or more manipulation instructions, wherein the one or more data records further comprises the subgroup code for identifying the subgroup associated with the one or more manipulation instructions.

13. A non-transitory, computer-readable medium storing one or more instructions executable by a computer system to perform operations for data manipulation record storage, comprising:

sending, by a server, one or more manipulation instructions to a database, wherein the one or more manipulation instructions are in a structured query language (SQL) format;

receiving, by the server from the database, an execution result of the one or more manipulation instructions;

generating, by the server, one or more data records comprising the one or more manipulation instructions and the execution result;

performing, by the server, classified storage based on one or more types of the one or more manipulation instructions in each data record, wherein performing classified storage comprises:

determining, by the server, that a predetermined condition of generating a data block is satisfied;

determining, by the server, a type of manipulation instructions that the data block stores;

determining, by the server, at least a portion of the data records that includes the type of manipulation instructions and corresponding execution results;

calculating, by the server, a first hash value based on the at least a portion of the data records and a second hash value of a newest data block of a blockchain-type ledger;

generating, by the server, the data block that includes the at least a portion of the data records and the second hash value, wherein, data records comprising the same type of manipulation instructions are written into the same data block;

appending the data block to the blockchain-type ledger;

receiving, by the server, a request to verify the at least a portion of the data records from a user terminal, wherein the request includes a third hash value calculated by the user terminal;

determining, by the server based on searching the blockchain-type ledger, that the first hash value matches the third hash value; and sending, by the server to the user terminal, the at least a portion of the data records and an indication indicating that the at least a portion of the data records are correct.

14. The non-transitory, computer-readable medium of claim 13, wherein the data block is a starting data block of the blockchain-type ledger, the data block has a predetermined block-height.

15. The non-transitory, computer-readable medium of claim 13, wherein the data block is not a starting data block of a blockchain-type ledger, and a block height of the data block is greater than a block height of an immediately preceding data block of the newest data block.

16. The non-transitory, computer-readable medium of claim 13, wherein the predetermined condition of generating a data block is one of a volume of the data records reaches a predetermined threshold and a last data block has been generated for a predetermined time.

17. The non-transitory, computer-readable medium of claim 13, wherein the one or more manipulation instructions are in a subgroup of the SQL format selected from a data definition language (DDL), a data manipulation language (DML), and a data control language (DCL), the execution result further comprises output parameters corresponding to input parameters in the one or more manipulation instructions.

18. The non-transitory, computer-readable medium of claim 17, further comprising:

determining, by the server, a subgroup code of the subgroup of the SQL format of the one or more manipulation instructions, wherein the one or more data records further comprises the subgroup code for identifying the subgroup associated with the one or more manipulation instructions.

* * * * *